June 5, 1934.                L. EMANUELI                1,962,059
HIGH TENSION ELECTRIC CABLE
Filed Sept. 1, 1925          3 Sheets-Sheet 1
Fig. 1.
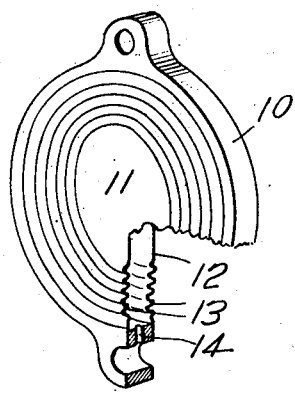
Fig. 5.
Fig. 6.
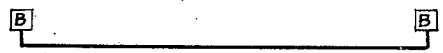
Fig. 7.
Fig. 10.
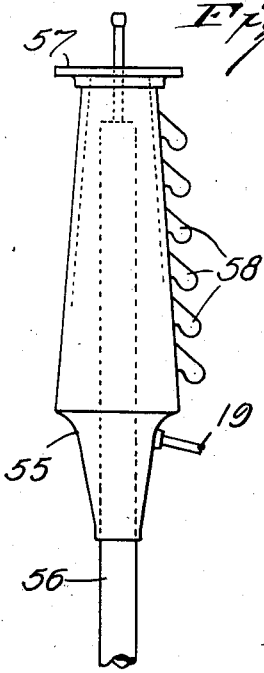
Fig. 8.
Fig. 9.
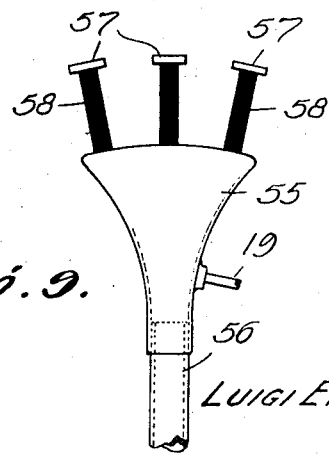
Inventor
LUIGI EMANUELI,
By Emil Bonnelycke
Attorney

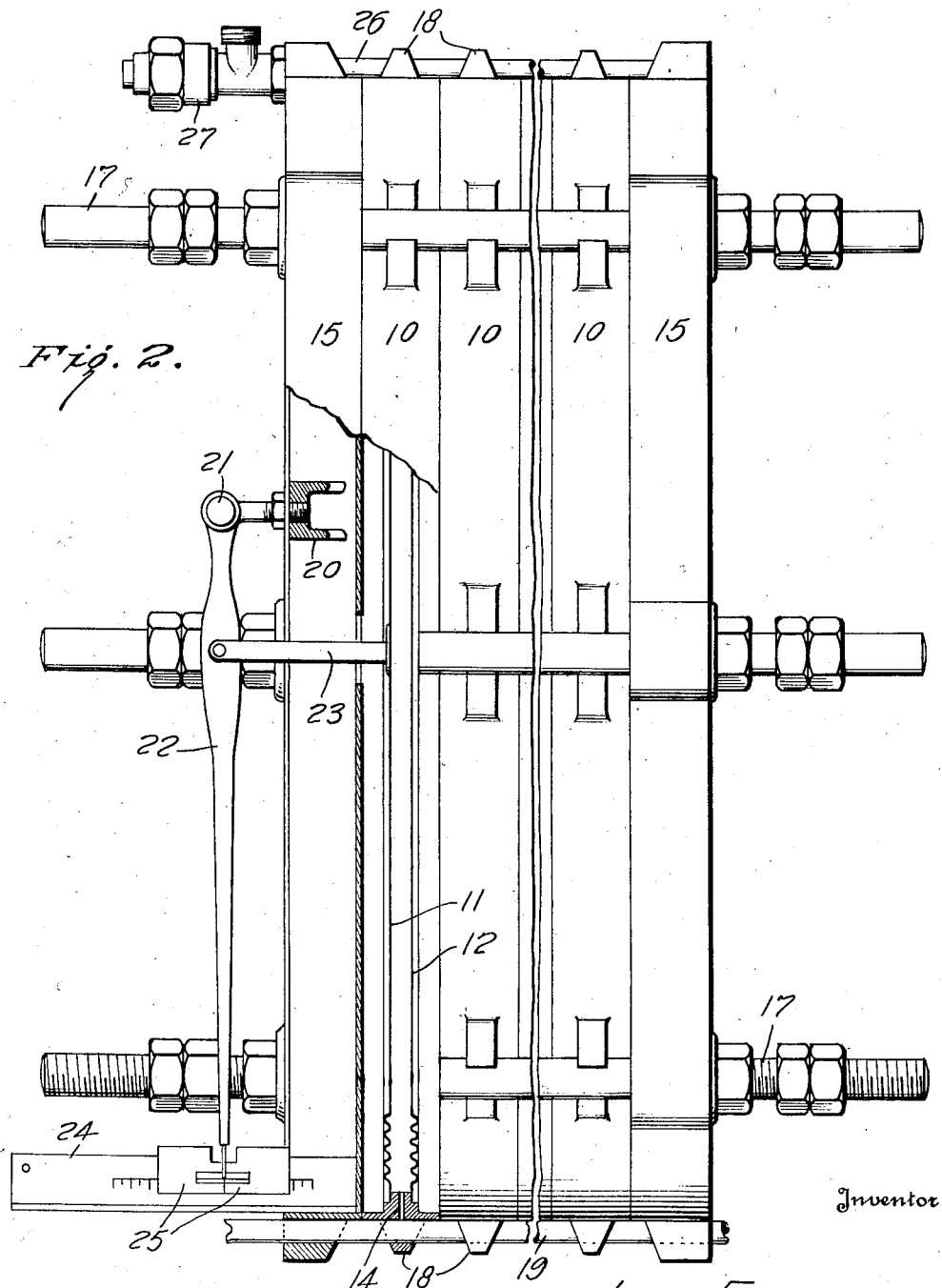

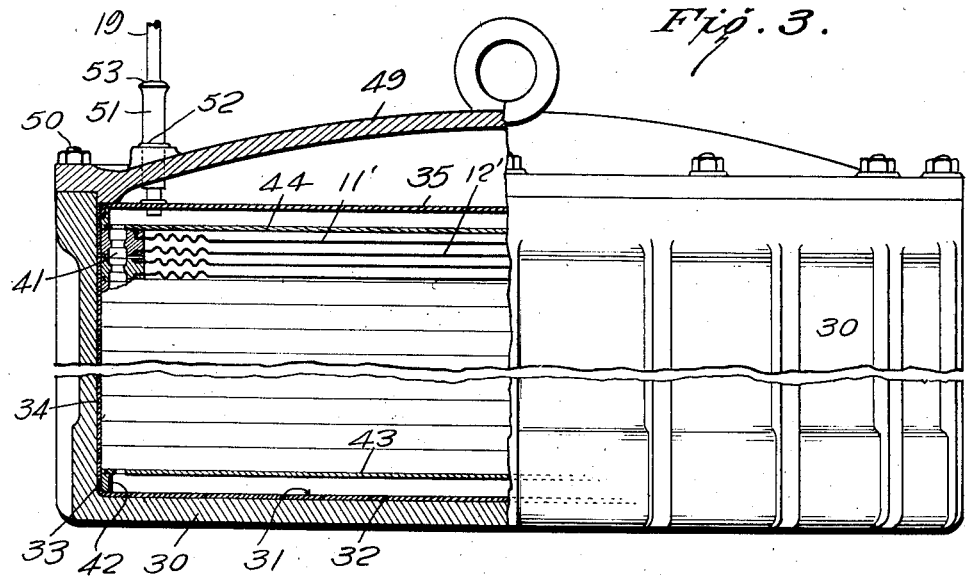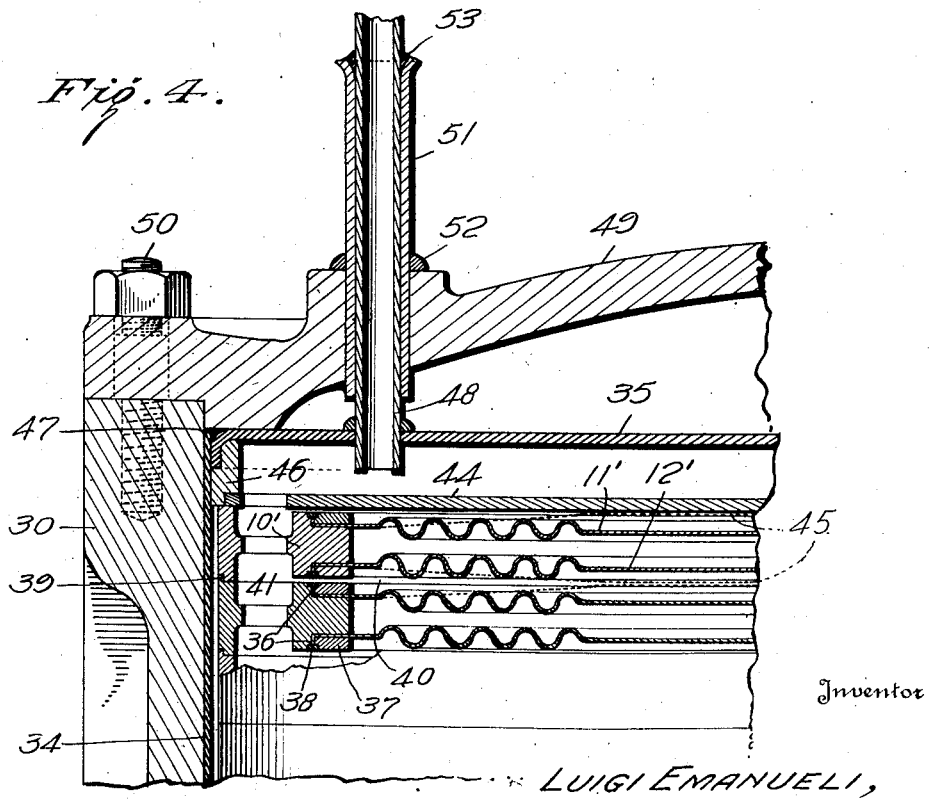

Patented June 5, 1934

1,962,059

UNITED STATES PATENT OFFICE 1,962,059

HIGH TENSION ELECTRIC CABLE

Luigi Emanueli, Milan, Italy, assignor to Societa Italiana Pirelli, Milan, Italy, a corporation of Italy Application September 1, 1925, Serial No. 53,930
In Italy July 11, 1925

14 Claims. (Cl. 173—264)

The present invention relates to high tension electric cables of the type in which the conductor is covered with paper or other factory-made insulation and is enclosed in a lead sheath or covering. Either in the center of the conductor or between the factory insulation and the sheath are one or more passages which contain a body of oil which acts as an insulator.

In such a cable, it is essential to prevent the entrance of air inside of the sheath as it very greatly reduces the effective insulation; and to do this, it is necessary at all times to keep the sheath filled with oil and to keep the oil out of contact with the air. Furthermore, in cables of the character indicated, the changes of temperature due to the heating effect of the current and to climatic changes (which may under extreme conditions amount to as much as 70° centigrade) cause expansion and contraction, with the result of forcing oil out of the passage in the sheath as the temperature rises and producing a suction effect as the temperature falls.

My invention has for its object to provide a means or arrangement of parts including variable capacity reservoirs which will automatically compensate for these changes of temperature and which will keep the passage or passages within the sheath filled with oil at all times, and which will also prevent the admission of air.

In the accompanying drawings, which are illustrative of my invention: Figure 1 is a perspective view of one element of a variable capacity feeding reservoir; Fig. 2 is a view in elevation, with certain of the parts broken away, of a reservoir composed of a number of such elements; Fig. 3 is a view partly in elevation and partly in section of a variable capacity pressure reservoir which is used at intermediate points along the length of the cable; Fig. 4 is an enlarged sectional view of a detail of Fig. 3; Figs. 5 to 8 inclusive, show the arrangement of the reservoirs with respect to the cable; and Figs. 9 and 10 are diagrammatic views showing how the reservoirs are connected to the cable.

As indicated above, if the insulating oil is permitted to be in contact with the atmosphere, even over a limited area, air will enter the cable in solution with the oil and appear in the form of bubbles which ultimately causes a breakdown of the cable. Hence it is of the utmost importance in high tension cables that air be excluded not only from the oil but from any interior portion of the cable as well. To this end I employ oil reservoirs which are completely closed and airtight.

In Fig. 1 is shown one of the elements or cells of which the feeding reservoir is composed. It comprises a metal holder 10 which may be round or of other shape and has shoulders on opposite sides upon which are seated flexible walls or diaphragms 11 and 12 which are carefully soldered or otherwise secured thereto at their peripheries in a manner to prevent the entrance of air and the escape of oil. The diaphragms are corrugated at 13 so as to increase the amount which they can bend or yield in response to small changes of oil pressure, the oil being confined between them. If the diaphragms or flexible walls are thin enough, the oil in the cells and in the cable will be at substantially constant atmospheric pressure, but if made thicker or stiffer the oil can be kept under certain conditions at a pressure above atmosphere. By preference the holder and diaphragms are made of a metal or metals which will resist the corrosive action of the atmosphere in which they are located. Oil enters and leaves the chamber in the element through the passage 14, the latter communicating with the interior of the cable sheath. The reservoir is situated above the cable and feeds oil thereto under gravity head.

For most purposes it is preferable, in order to have sufficient capacity, to make the reservoir of a number of such expansible elements as shown in Fig. 2. To this end, two heads 15 are provided between which the several elements are located, the several parts being clamped together by rods 17 and retaining nuts. Each element has a projection 18 through which passes a copper tube 19 having openings in register with the passages 14, the joints between the tube and the elements being carefully soldered. The tube itself is connected to the sheath of the cable by special joints as will appear later. The number of elements which are thus united will be governed by the volume of oil in the cable which is fed by the reservoir, long cables or cable sections requiring a greater number than short cables or cable sections. The outer faces of the diaphragms are exposed to atmospheric pressure so that they can freely move in response to varying amounts of oil in the chambers, but the oil itself is always protected from contact with the air.

In such an arrangement, it is important to know the amount of oil contained in the reservoir at different times, as well as to have a record of the changes, which is done by measuring the amount of expansion and contraction of the walls or diaphragms of one of the elements. This is made possible due to the fact that the chambers of all of the cells or elements are connected in parallel by the tube 19 which equalizes the pressures therein. On one of the end heads is mounted a fixed support 20 which carries the pivot 21 for a lever arm or pointer 22 which is connected to a diaphragm by a rod 23 in such a manner that as the diaphragm moves in and out motion will be imparted to the arm. Fixed to the bottom edge of the head is a scale-plate 24 having suitable indicating marks therein, and mounted on this plate are two separate weights 25 which are arranged to be moved by the arm 22, one weight being moved when the diaphragm moves inwardly and the other when the arm moves outwardly. Since there is no restoring means for the weights, their respective positions on the scale will register any change of position of the actuating diaphragm; that is to say, will register the maximum and minimum volume of oil in the reservoir at any time since the last inspection.

The position of the arm 22 at any given instant will indicate the amount of oil in the reservoir. Since all the chambers in the reservoir are connected in parallel through the passages 14 and tube 19, the movement of the end diaphragm will be proportional to the volume of oil contained in the reservoir. The scale may be calibrated in terms of volume. To fill the reservoir, an inlet pipe 26 is provided which has a suitable controlling valve 27 and which may be connected to the different diaphragm chambers in the same manner that tube 19 is connected so that oil is fed in parallel to said chambers. Ordinarily the reservior will be only partly filled with oil.

In Figs. 3 and 4, I have shown a form of pressure reservior of variable capacity which differs particularly from the feeding reservoir previously described in that the chamber between each pair of diaphragms, instead of acting as a receiver for oil, is a hermetically sealed cell and contains a body of air or other gas at some predetermined pressure, usually that of the atmosphere. 30 indicates an outside casing which is commonly made of cast iron to ensure the necessary strength and to resist corrosion. Inside of this casing is a second casing or container 31 which is made of thin copper, brass or other metal which is easily soldered or welded for the purpose of ensuring tight joints. As shown, the inner casing comprises a flat bottom wall 32 having an upturned peripheral edge 33, a cylindrical portion 34 and a cover 35, all these various parts being united by brazing or soldering, the cover 35 being applied after the inner parts are assembled. Inside the casing is a plurality of elements or cells which are generally similar to the element shown in Fig. 1 with the exception that the chamber between each pair of diaphragms or flexible walls is hermetically sealed. The diaphragms 11' and 12' are each provided with an outturned flange 36 and are seated on shoulders formed on the holder 10'. Rings 37 are also provided which engage the diaphragms in the region of the flanges, and these parts are united at 38 by means of a soldered joint. The holders are connected one to the other by rabbeted joints 39.

It will be noted that chambers 40 are formed between the outer faces of adjacent diaphragms, and that they are connected by one or more vertical passages 41. These chambers are always filled with oil and usually at a pressure above atmosphere—in one case of which I have knowledge, the pressure is thirty pounds. It will be understood, however, that this oil does not come in contact with the air or other gas contained in the compressible cells. Situated in the bottom of the casing is a ring 42 which acts as a support for the various elements, and between the top of this ring and the adjacent element is a flat plate 43 having one or more holes registering with the passages 41 so as to afford a free circulation of the oil contained in the casing; said plate acting as a stop to limit the outward movement of the lowest diaphragm. After the elements are mounted in the casing, a plate 44 is mounted above the topmost element for the purpose of limiting the upward movement of the upper diaphragm just as the plate 43 limits the downward movement of the lowest diaphragm. The outward movements of the intermediate diaphragms are limited to a point where they contact one with the other as shown by the dotted lines 45 (Fig. 4).

Above the upper stop plate 44 is mounted a shouldered ring 46 upon which the cover 35 is seated and soldered as indicated at 47, thus forming a closed airtight reservoir. 48 indicates a tube for conveying oil to and from the interior of the reservoir and which is soldered to the cover 35. 49 indicates a cast metal cover for the outer casing 30 and which is held in place by a series of bolts 50. As it would be difficult to seal the tube 48 to the cover 49 after the parts are assembled, and because it would be difficult to open and renew such joints, I provide a sleeve 51 which is welded or soldered at 52 to the said cover. The upper end of this sleeve is flared; and after the parts are assembled as shown, the flared end of the sleeve is united to the tube by a wiped soldered joint 53.

From the foregoing, it will be seen that the sealed, flexible walled expansible air cells may be compressed and thus constitute means for exerting pressure on the oil, while at the same time, they serve as means for preventing contact between the oil and air.

In Fig. 9 is shown a terminal end for a three-conductor cable, in which 55 indicates a casing which is soldered to the sheath 56 of the cable and which is flared outwardly from the lower end. 57 indicates the metal plates which are soldered to the conductors and are supported by insulating posts 58. To these plates are connected the conductors which lead to the overhead lines, switchboard or other desired place. 19 indicates the previously-mentioned conduit which is connected to a feeding reservoir for maintaining the casing 55 and the interior of the posts 58 filled with oil, such reservoir being necessarily located above the highest point to be filled with oil.

Fig. 10 shows a terminal end similar to that of Fig. 9 but designed for a single conductor cable; and as the general construction is the same, further description is unnecessary.

The length of cable that may be fed by a reservoir depends upon the shape and size of the oil passage therein, upon the rate at which the cable cools and upon the viscosity of the oil. As the cable cools, the oil contracts and the feeding reservoir then supplies oil which is distributed over a considerable length of cable. Care should be taken to see that the hydrostatic pressure is great enough to prevent the formation of a vacuum and consequent voids in the cable under all conditions.

In Figs. 5 to 8 inclusive is illustrated the application of the feeding and pressure reservoirs to a section or part of an underground high-tension cable system. Fig. 5 shows the application of a feeding reservoir A of the character disclosed in Figs. 1 and 2, said reservoir being situated at one end of a cable section and sufficiently above the level thereof to insure a complete filling of the passages and voids in the cable with oil.

Fig. 6 represents the application of a pressure reservoir B of the character disclosed in Figs. 3 and 4 to both ends of a section of cable. In this case, sufficient oil is pumped into the reservoir under suitable pressure to fill the chambers between the elements or cells, and any expansion of the oil in the cable due to heating will cause compression of the air within the said cells or diaphragm chambers, which compression will cause the oil to feed back into the cable as the latter cools.

In Fig. 7 is shown the application of both types of reservoirs to the ends of the same section or length of cable, which section is longer than those previously mentioned. In this case, the reservoir A will feed oil into the cable and also fill the pressure reservoir B. As the temperature of the cable rises, the oil in it and in the reservoir B will cause an increase of pressure in the diaphragm chambers and, if the temperature rise is a substantial one, will also cause an increase in the volume of oil contained in the feeding reservoir A. As the cable cools, oil will be forced out of the reservoir B by the air pressure confined between the diaphragm of each cell, and oil will flow by gravity from the reservoir A, the action of the two being such as to keep all of the voids in the cable completely filled with oil and free from the presence of air in the form of bubbles or otherwise at all times.

Fig. 8 shows a cable having a single feeding reservoir at one end and a number of pressure reservoirs located at intermediate places in the length of the cable, the number of pressure reservoirs depending upon the viscosity of the oil and on the resistance which is offered to the flow thereof.

In a cable system of the character herein described, the simultaneous use of feeding reservoirs and pressure reservoirs is very important, especially where each section of cable is of considerable length. Consider for example the arrangement shown in Fig. 7. The feeding reservoir A is of the atmospheric pressure type and is of such capacity as to fully take care of the expansion and contraction of the oil in the cable due to temperature changes. Being at a greater elevation than the pressure reservoir B, it has a greater effective pressure and serves to maintain the reservoir B filled with oil and at a pressure equal to the hydrostatic head corresponding to the difference in level of the fluid in the two reservoirs. The flow of oil through the channel within the cable is slow, depending upon the viscosity of the oil, the character of the channel and its length. In other words, these factors determine the resistance to flow of the oil. As a result of heating the cable from any cause, as for example by passing a large amount of current through it, the oil will expand and flow from the cable into reservoir A and will also flow into the reservoir B and somewhat raise the pressure within it. As the cable cools, it would take a relatively long time for the oil to flow from the reservoir A to the far end of the cable and in a long section a vacuum would exist at the far end were it not for the presence of the pressure reservoir B. The joint action of the two types of reservoirs on the cable is somewhat complex due to their mutual actions on the oil. Consider the case of a cable which is unloaded; its temperature will be that of the earth or approximately so. Oil will be at a certain level in the feeding reservoir and at a certain pressure in the pressure reservoir. When current, say full load current, is admitted to the cable its temperature steadily rises for some ten or fifteen hours, after which it becomes practically constant. The oil pressure, however, rises at a much more rapid rate and after a short time reaches its maximum, after which it decreases to the normal value which may be reached in ten or fifteen hours. During the early stages of this cycle, oil is being discharged from the cable into both the feeding and pressure reservoirs, the oil level rising in the feeding reservoir and the pressure increasing in the pressure reservoir. At some part of the cycle and after maximum oil pressure has been reached in the pressure reservoir, the latter begins to feed oil back into the cable and from which it flows into the feeding reservoir, and ultimately and after several hours the pressure of the oil in the pressure reservoirs drops to its normal value and the excess of oil due to its expansion by reason of the heat of the cable is forced wholly or chiefly into the feeding reservoir. In a well designed cable system, at or about the time the cable reaches its maximum constant temperature the pressure reservoir will have discharged the excess of oil received during the initial part of the cycle back into the cable and the pressure exerted thereby will be substantially that due to the difference in level of the two reservoirs.

Under the conditions above specified the presence of a vacuum with accompanying voids within the cable itself is avoided, and the objections incident thereto, such as ionization followed by glowing and arcing, are prevented. As an illustration of the effect of a vacuum, if the breakdown voltage of a cable of the character described, which is completely filled with oil at a pressure somewhat above atmosphere, is approximately 400,000 volts, the break-down voltage for the same cable when a vacuum exists within the sheath may be reduced to approximately 80,000 volts, or to one fifth. These figures may vary somewhat with cables of different construction but the differences in the two cases will be of the order mentioned.

In Fig. 8 the advantages set forth above are attained to a much greater degree. This figure is intended to represent a cable of considerable length. It has an atmospheric feeding reservoir A and at suitable spaced intervals are provided pressure reservoirs B which, on account of their number, may be somewhat smaller than where only one is provided. As the cable heats each of these reservoirs will receive its share of the oil from within the cable due to expansion and subsequently feed it back to the cable. As a result of the use of these numerous intermediate reservoirs the oil within the cable has an appreciably shorter distance to travel in a longitudinal direction with the result that the oil pressure within the cable is more nearly uniform at all times and the danger of a vacuum and consequent voids existing in any region of the cable is reduced to a minimum. Furthermore, practically unlimited lengths of cable can be serviced by the last named arrangement.

In the event that a diaphragm in the feeding reservoir is ruptured, oil will be discharged therefrom to atmosphere where the leakage can be detected. On the other hand, if a diaphragm of a pressure reservoir ruptures, it cannot be readily detected, and for that reason greater care and expense are entailed in their manufacture. However, by making each diaphragm chamber small if a rupture does occur, only the air or other gas contained therein is released. The container of the reservoir is purposely made strong enough to withstand a pressure much greater than it will ever be subjected to in service.

The specific construction of the pressure type reservoir per se is not claimed herein, as it forms the subject matter of my divisional Patent No. 1,809,927, June 16, 1931.

I claim as my invention:—

1. A variable capacity reservoir, embodying a plurality of companion cells, each comprising an annular holder, and a pair of flexible diaphragms closing the opposite sides thereof, said holder having a transverse passage formed through it to provide communication directly between the interior of the cell and the oil conduit.

2. A variable capacity reservoir embodying a plurality of companion cells adapted to contain oil and each comprising a central body or holder, an apertured projection thereon, and a pair of flexible diaphragms closing the opposite sides of the holder; and a conduit extending through the apertures in all the projections and having a perforation within each aperture, each cell holder having an internal passage which opens at one end into the interior of the cell and at the other end into the respective conduit perforation.

3. In a high tension electric cable installation, the combination of a sheathed cable having a passage therein containing insulating fluid, completely closed variable capacity pressure reservoirs each containing a sealed gas filled chamber having a flexible wall, means connecting the reservoirs to the passage at spaced intervals along its length, said reservoirs and connecting means being filled with insulating fluid under pressures which vary with change of temperature of the cable, a variable capacity feeding reservoir comprising an expansible chamber which is freed of air and sealed against the admission thereof, and which contains insulating fluid and maintains it under a substantially constant pressure, and means connecting the expansible chamber of the feeding reservoir with the passage in the cable whereby it receives the fluid from the passage and the pressure reservoirs as the pressure therein rises due to heating of the cable, and feeds it back thereto as the cable cools.

4. In a high tension cable installation, the combination of a sheathed cable having a passage therein containing insulating fluid, completely closed variable capacity pressure reservoirs each containing a sealed gas filled chamber having a flexible wall, conduits connecting the reservoirs to the passage at spaced intervals along its length, said reservoirs, conduits and passage being filled with insulating fluid under pressure constantly maintained by the gas in said chamber above that of the atmosphere, which pressure varies with changes of temperature of the cable, a variable capacity feeding reservoir comprising an expansible chamber which contains insulating fluid at a substantially constant, effective pressure which is greater than that of the atmosphere and prevents internal gas voids, and a conduit connecting the expansible chamber of the feeding reservoir and the passage whereby it receives fluid from the passage and the pressure reservoirs as the pressure therein rises due to heating of the cable and feeds it back thereto as the cable cools.

5. In a high tension cable installation, the combination of a sheathed cable having a passage therein containing insulating fluid at a pressure above that of the atmosphere, closed variable capacity, variable pressure reservoirs located at approximately the same elevation as the cable, each of said reservoirs containing a sealed gas filled chamber having a flexible wall, conduits connecting the reservoirs to the passage as spaced intervals along its length, the pressure of the fluid within the reservoirs and conduits being maintained by the gas in said chamber and rising and falling with changes of temperature of the cable, a variable capacity feeding reservoir comprising an expansible chamber sealed against the admission of air and containing and maintaining the fluid therein at a subtantially constant pressure under operating conditions, said feeding reservoir being elevated sufficiently above the level of the cable and pressure reservoirs to ensure complete filling thereof, and a conduit connecting the said expansible chamber to the passage, whereby the former receives fluid from the passage as the pressure within the pressure reservoirs rises due to heating of the cable, and feeds it back as said pressure falls due to cooling.

6. In a high tension electric cable system, the combination of a metal sheathed cable having a longitudinal passage therein which is filled with insulating fluid under a pressure greater than that of the atmosphere which is freed of air, a plurality of hermetically sealed, variable pressure reservoirs filled with fluid at the same pressure as that in the cable passage, a chambered cell located within each pressure reservoir which expands and contracts with changes of pressure of the fluid and which tends at all times to force fluid out of the reservoir, conduits connecting the reservoirs to the cable passage at spaced intervals, an hermetically sealed feeding reservoir containing a relatively large amount of fluid, which reservoir is located above the level of the cable and has expansible walls, the exterior surfaces of which are exposed to substantially atmospheric pressure and a conduit connecting the feeding reservoir with the cable passage and through it with the pressure reservoirs, whereby the fluid, on expanding in the passage due to a rise in temperature, will first enter the pressure reservoirs and increase the pressure therein, after which said cells force fluid therefrom into the cable passage and through it into the feeding reservoir.

7. In a high tension electric cable system, the combination of a sheathed cable having a longitudinal passage therein which is filled with insulating fluid under a pressure greater than that of the atmosphere which is freed of air and is thus maintained, a feeding reservoir comprising chambered cells each having flexible walls, the exterior surfaces of which are exposed to atmospheric pressure, a conduit means which is in free communication with the passage in the cable and with the chambers within the cells, a pressure reservoir comprising an airtight casing and sealed chambered cells located therein, the walls of each cell being flexible and exposed to fluid pressure within the casing and exerting a variable opposing pressure thereon greater than that of the atmosphere, and a conduit connecting the casing to the passage, whereby the fluid, on expanding in the cable passage due to a rise in temperature, accompanied by a rise of pressure, will first enter the said casing and compress the walls of the cells, said walls thereafter forcing fluid out of the casing into the passage and through it into the cells of the feeding reservoir 8. A variable capacity reservoir comprising a plurality of cells, arranged to form a stack, each comprising a supporting ring, a pair of flexible diaphragms secured to the ring at their peripheries to form a chamber, said rings being supported one by the other and acting as spacers for the cells, a passage in each ring through which fluid flows into and out of its chamber, a conduit to which all of the passages are connected in parallel to convey fluid and which equalizes the pressures within the chambers, and means for holding the cells in stacked relation.

9. A variable capacity reservoir comprising a plurality of cells arranged to form a stack, each comprising a supporting ring, a shoulder on the ring, a pair of diaphragms secured to the shoulder to form a chamber, said rings resting one on the other and acting as spacers for the cells, a radial passage in each ring through which fluid flows into and out of the chamber, a conduit to which all of the passages are connected in parallel to convey fluid and which equalizes the pressures within the chambers, heads at the ends of the stack, and means for clamping the end heads to hold the cells in position.

10. A variable capacity reservoir comprising a plurality of cells arranged to form a stack, each comprising a peripheral supporting ring and a pair of diaphragms secured thereto to form a chamber, means for holding the cells in axial alignment, a passage in each ring through which fluid flows into and out of its chamber, a conduit to which all of the passages are connected in parallel and which equalizes the pressures therein, a second passage in each of said rings, and a conduit connected to said second passages for supplying fluid to the chambers in parallel.

11. A variable capacity reservoir comprising a plurality of cells arranged to form a stack, each of which comprises a pair of diaphragms and means located at their peripheries for uniting them to form a chamber, a passage extending outwardly through said uniting means from each chamber and through which fluid is free to flow, means for holding the cells in axial alignment, a conduit to which all of the passages are connected in parallel and through which the pressures within the chambers are equalized, and indicating means actuated by one of the diaphragms, whereby the amount of the fluid within the reservoir may be determined.

12. A variable capacity reservoir comprising a plurality of independent separable cells arranged to form a stack, each of which comprises a pair of corrugated diaphragms, a means for uniting each pair of diaphragms at their peripheries to form chambers, means disposed at the peripheries of the cells to hold them in spaced relation with clearances between adjacent diaphragms, a conduit for each cell which communicates with the chamber therein, and a second conduit with which the first named conduits are connected, whereby fluid is permitted to freely flow into and out of the chambers.

13. In a high tension electric cable system, the combination of a length of sheathed cable having a longitudinal passage therein, which is filled with insulating fluid under pressure, a variable capacity feeding reservoir comprising a closed expansible chamber having flexible outer walls and containing insulating fluid at substantially constant pressure, a conduit connecting said reservoir and cable passage, a pressure reservoir comprising a closed receptacle containing insulating fluid, a conduit connecting said receptacle with the passage in said cable at a point remote from the point of connection of the conduit of said feeding reservoir, and means within said receptacle for continuously subjecting the fluid therein to the pressure of a confined elastic gas while at the same time absolutely preventing contact of the fluid with said gas.

14. In a high tension electric cable system, the combination of a length of sheathed cable having a longitudinal passage therein, which is filled with insulating fluid under pressure, a variable capacity feeding reservoir comprising a closed expansible chamber having flexible outer walls and containing insulating fluid at substantially constant pressure, a conduit connecting said reservoir and cable passage, a pressure reservoir comprising a closed receptacle containing insulating fluid, a conduit connecting said receptacle with the passage in said cable at a point remote from the point of connection of the conduit of said feeding reservoir, and a sealed, gas filled, compressible chamber within said receptacle and having a flexible wall exposed to the fluid, whereby said fluid is subjected to the pressure of the gas in said chamber while maintained wholly out of contact therewith.

LUIGI EMANUELI.